United States Patent

Sanders

[11] 4,123,162
[45] Oct. 31, 1978

[54] MULTIOSCILLATOR RING LASER GYRO OUTPUT INFORMATION PROCESSING SYSTEM

[75] Inventor: Virgil E. Sanders, Newbury Park, Calif.

[73] Assignee: Litton Systems, Inc., Woodland Hills, Calif.

[21] Appl. No.: 766,986

[22] Filed: Feb. 9, 1977

[51] Int. Cl.$^2$ ............................ G01B 9/02; G01P 9/00
[52] U.S. Cl. ................................................ 356/106 LR
[58] Field of Search .................................. 356/106 LR

[56] References Cited
U.S. PATENT DOCUMENTS 3,937,578  2/1976  Andringa ...................... 356/106 LR Primary Examiner—Vincent P. McGraw
Attorney, Agent, or Firm—Harold E. Gillmann

[57] ABSTRACT

A four mode ring laser gyro has its four modes at different frequencies combined and applied to a single photo diode. The output from the photo diode is applied to a non-linear device, and the resultant sum and difference frequencies are applied to (1) a laser cavity length control circuit, (2) a rotation rate detection circuit, and (3) a rotation direction determination circuit. The cavity length control circuit operates by the determination of 100% modulation of one of the beat frequencies by a second one. The direction determination circuit utilizes the phase of an AC dithering power supply which varies the anode to cathode plasma current of the laser gyro.

10 Claims, 4 Drawing Figures

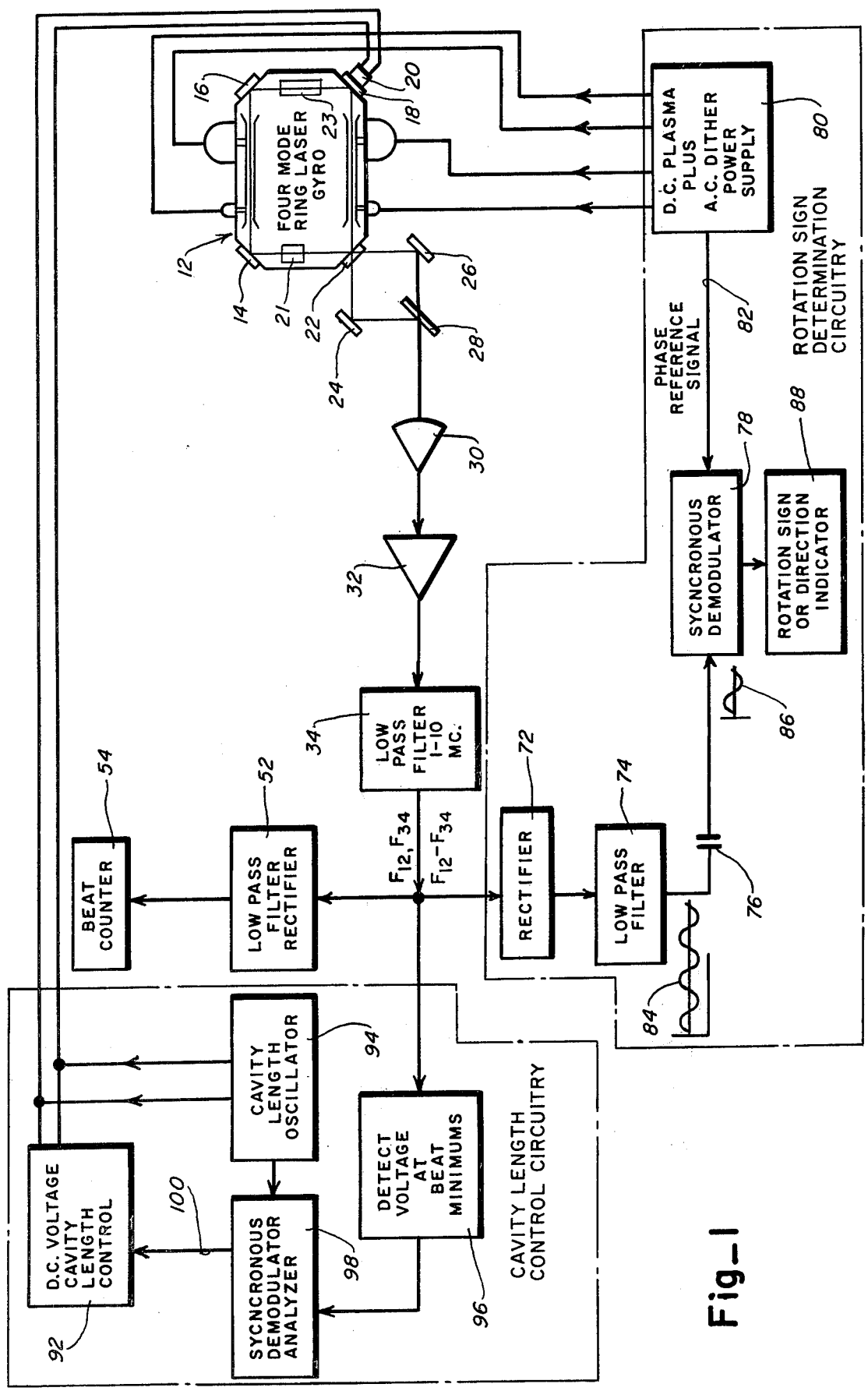
Fig.—1

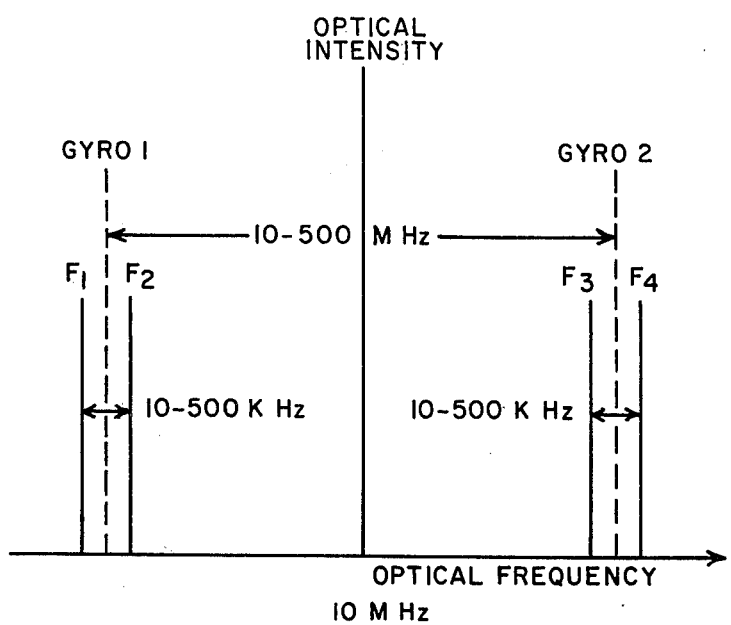
Fig_2
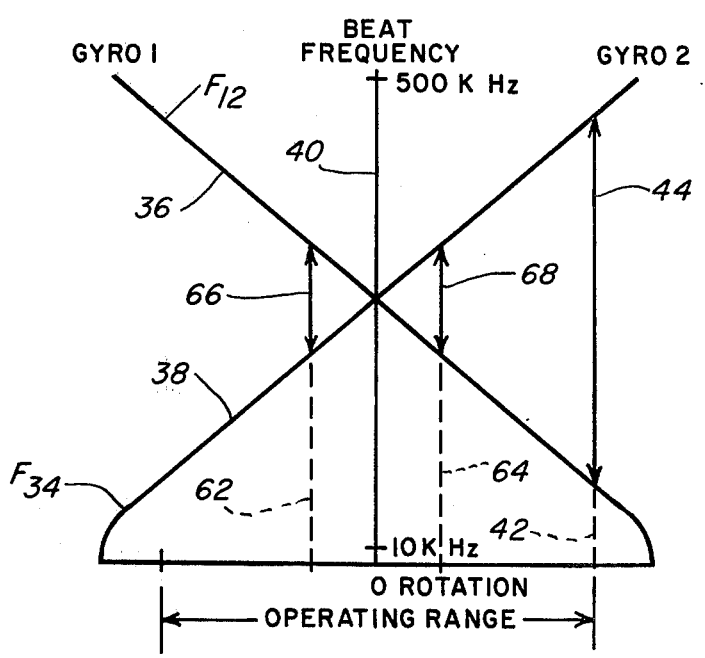
Fig_3
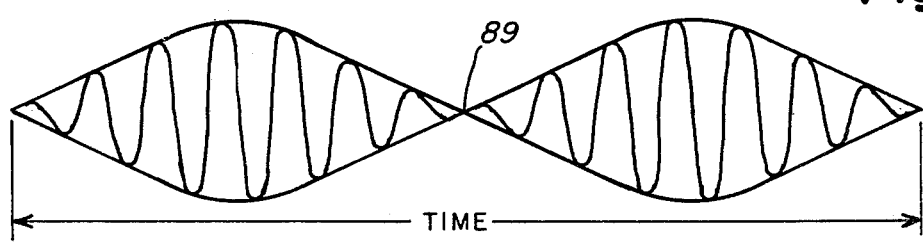
Fig_4

MULTIOSCILLATOR RING LASER GYRO OUTPUT INFORMATION PROCESSING SYSTEM

BACKGROUND OF THE INVENTION

1. Field of the Invention

This invention relates to laser gyros of the four mode type.

This class of devices is described for example in a text entitled "Laser Applications" edited by Monte Ross, Academic Press, Inc. New York, N.Y. 1971 in which pp. 134 to 200 relating to "The Laser Gyro" are particularly to be noted.

It is well known that two counterrotating laser beams may be established in a ring type laser. When the ring laser is rotated about an axis perpendicular to its plane or passing centrally through the ring laser, the frequency of the oscillations are shifted, with the frequency of the beam travelling in the direction of rotation exhibiting a decrease, and the frequency of the beam travelling in the direction opposite to the rotation exhibiting an increase. The amount of rotation may be determined by detecting the beat frequencies between the counterrotating beams. Using a set of three laser gyros, this phenomenon may be used in inertial guidance systems to determine the rotation and the resultant orientation of an airplane or the like.

Four more laser gyros are known in the art, and they employ optical crystals and Faraday effect devices to shift the frequency of the laser beams. However, the biasing and detection schemes which have been proposed up to the present time have been unduly complex and have had high noise levels associated with them.

Accordingly, principal objects of the present invention are the simplification and reduction in noise of four mode multi-oscillator laser gyros.

SUMMARY OF THE INVENTION

An important aspect of the present invention includes a simple detection arrangement for the four optical frequencies passing through one of the mirrors of a multi-oscillator ring laser gyro. The four optical frequencies passing through the mirror may be directly heterodyned, and the resulting signals are applied to the following three circuits:

(1) A laser cavity length control circuit.
(2) A rotation rate detection circuit.
(3) A rotation direction determination circuit.

In accordance with one feature of the invention, the direction of rotation is determined through the use of power supply having an AC component for oscillating or dithering the laser plasma current and using the AC component from the plasma power supply as a phase standard for detecting the sign or direction of rotation of the ring laser gyro.

In accordance with another feature of the invention, the transducer which controls the length of the cavity is periodically swept or oscillated to vary the lasing mode frequencies of the gyro, and is fixed at the transducer control voltage, giving equal magnitude beat frequencies to the two two-mode laser gyros in the four mode ring laser gyro, as indicated by 100% modulation, as detected from the heterodyned output of the four signals.

Other ojbects, features, and advantages of the invention will become apparent from a consideration of the following detailed description and from the attached drawings.

BRIEF DESCRIPTION OF THE DRAWINGS

FIG. 1 is a block diagram of the multi-oscillator ring laser gyro block circuit diagram in accordance with the present invention;

FIG. 2 is a diagram indicating the four modes which will be detected in accordance with the system of the present invention;

FIG. 3 shows the beat frequencies versus rotation which are detected by the block circuit diagram of FIG. 1; and FIG. 4 is a diagram of the intermodulated beat signal received from the detector of FIG. 1 when the cavity has the optimum length.

DETAILED DESCRIPTION

With reference to FIG. 1, the four mode ring laser gyro at 12 includes four mirrors at its corners, including the two simple mirrors 14 and 16, and the mirror 18 which is provided with a piezoelectric transducer 20 for controlling the cavity length of the ring laser gyro. In addition, the fourth mirror 22 is only partially reflecting, permitting the transmission of four modes through the mirror 22.

The four mode ring laser gyro is also provided with suitable crystals 21 and Faraday effect device 23, as is well known in the art for producing four modes, as shown in FIG. 2, for example. The crystal 21 may be of quartz.

Incidentally, as is well known in the art, there are two modes or different types of polarized beams which are incident on the partially reflective mirror 22. These are the so-called left and right circularly polarized waves. Only the "P" polarized components of the four waves pass through the output mirror readily, while the "S" polarized components of the waves do not, where the "P" polarized components have their electric vector parallel to the plane of the ring laser and the "S" polarized components are orthogonal to the plane of the laser. While the "S" waves are not totally blocked, the ratio of transmission to rejection for "P" and "S" modes is typically about 100 to 1.

Passing through the mirror 22 are the two "P" components of laser modes 1 and 4, which impinge on mirror 24 from one direction of travel around the ring laser, and the two oppositely directed "P" components of laser modes 2 and 3 which impinge on mirror 26. These two set of modes are combined by the partially reflecting "beam splitter" or beam combiner mirror 28, and all four modes impinge on the photo diode 30. As indicated in FIG. 2 the two counter-rotating beams 1 and 2 may be thought of as making up a first gyro which may be designated Gyro 1, and the other two counter-rotating beams 3 and 4, which are spaced apart by approximately the same frequency (under non-rotation conditions) make up a second gyro known as Gyro 2.

Incidentally, to give an idea of the frequency ranges and the frequencies which may be involved, a normal helium neon laser gyro which exhibits the familiar bright and light red color, has a frequency of approximately $5 \times 10^{14}$ hertz or cycles per second.

Depending on the types of crystals and Faraday devices which are employed in the four mode ring laser gyro 12, of FIG. 1, the frequency of separation of Gyro 1 and Gyro 2, as shown in FIG. 2 may be in the order of approximately 10 to 500 megahertz, or millions of cycles per second. Also, it may be noted that depending on the Faraday effect device which is employed, the difference in frequency between the two counter-rotating beams making up each of the gyros designated Gyro 1 and Gyro 2, may be approximately 10 to 500 kilocycles per second, or kilohertz.

The photo-detector diode 30 is a square law detector and serves as a non-linear mixing or intermodulation element. At the input to the square law detector are frequencies $F_1$, $F_2$, $F_3$ and $F_4$ as shown in FIG. 2, for example. At the output of element 32 are the many sum and difference frequencies obtained by beating the various frequencies $F_1$, $F_2$, $F_3$ and $F_4$ together in the non-linear device 32. The low level signals at the output of photo-detector 30 are amplified by the broad band amplifier 32 and applied to filter 34. The low-pass filter 34 is set to pass only the beat frequencies between $F_1$ and $F_2$, and between $F_3$ and $F_4$, and the difference frequencies between the beats $F_{12}$ and $F_{34}$, and therefore may have a cut-off frequency of about two megahertz. Incidentally, in this connection, it may be noted that if the ring laser is not subject to any rotation, frequency $F_{12}$ will be equal to the frequency $F_{34}$ and there will be no beat frequency $F_{12}$ minus $F_{34}$.

FIG. 3 illustrates the inter-relationship between the various beat frequencies diagrammatically. In FIG. 3, the horizontal axis represents rotation of the ring laser about its central axis. The vertical axis in FIG. 3 represents frequency and ranges from about 10 kilohertz to 500 kilohertz. Gyro 1 as represented by frequency $F_{12}$ has a linear response and is represented by line 36 extending from the upper left of FIG. 3 to the lower right. Similarly, gyro 2 is represented by line 38 which extends from the upper right to the lower left in FIG. 3. At zero rotation, the two gyros have the same frequency and therefore, intersect the center vertical line 40 of FIG. 3 which represents zero rotation. As the ring laser is rotated in either one direction or another, the frequency of one of the two gyros increases while that of the other gyro decreases. A beat frequency is then developed and this is indicated by the distance between lines 36 and 38 along a line parallel to the center vertical line. For example, with rotation in the positive sense, as indicated by the dashed line 42, the intermodulation beat frequency between $F_{12}$ and $F_{34}$ is equal to the length of arrow 44.

Further reference will be made to FIG. 3 in discussing other aspects of the present system.

Referring back to FIG. 1, the rotation and the rate of rotation are determined by circuits 52 and 54. Circuit 52 detects the beat frequency $F_{12}$ minus $F_{34}$, and the beat counter 54 counts the beat difference between the two gyro frequencies. The number of beats detected by beat counter 54 indicates the rotation, and the number of beats per second indicates the rate of rotation of the ring laser.

By determining the output from beat counter 54, the rate of rotation of the ring laser is known. However, assuming that the rate of rotation is known and corresponds to either the dashed line 62 or the dashed line 64, as shown in FIG. 3 to the left and right of the zero rotation line, it is not known whether the detected beat between the two gyro signals is that indicated by the arrow 66 indicating rotation in one direction or that indicated by arrow 68, indicating rotation in the opposite direction. With reference to FIG. 1, this ambiguity is resolved by circuitry including the rectifier 72, the low pass filters 74, and the capacitor 76, the synchronous demodulator 78, and the plasma power supply 80. Incidentally, the power supply 80 which energizes the gas plasma within the ring laser includes both a D.C. power supply and also a differential AC dithering voltage which is superimposed on the DC which energizes the plasma. This dithering voltage which increases and decreases the plasma current, differentially or oppositely in the two opposite gain sections of the laser, has much the same effect as rotation of the laser gyro. A phase reference voltage synchronized with the AC dither of the plasma is applied to the synchronous demodulator 78 over lead 82. A slight change in the plasma current will cause both of the arrows 66 and 68 to shift in one direction, for example to the right, thus reducing the beat frequency 66 or increasing the beat frequency 68 as the plasma current is shifted. Through the use of the phase reference signal which is synchronized with the dithering of the plasma current, it is possible to determine the direction of rotation of the ring laser by determining whether the detected signal 84 or 86 is in phase with the phase reference signal or out of phase with it. This is determined by the synchronous demodulator 78 and is indicated by the rotation sign or direction indicator 88.

For proper operation of the ring laser, it is important that the amplitude of the signals making up gyro 1 (see FIG. 2), and the amplitude of the signals making up gyro 2 be substantially equal. When these conditions obtain, the beat between the frequencies $F_{12}$ and $F_{34}$ are as indicated in FIG. 4 of the drawings, and periodically drop to zero, as indicated at point 89 in FIG. 4. Thus, FIG. 4 indicates the characteristic intermodulation of $F_{12}$ and $F_{34}$ and is the classical form of amplitude modulation with maxima occurring when the sum of the instantaneous components are in phase, and the minima occurring when these components are 180° out of phase. If one of the signals $F_{12}$ or $F_{34}$ is significantly greater than the other, however, the beat signal will not drop to zero. Accordingly, by detecting the minimum points of the beat signal and then determining whether it is actually zero, and finally adjusting or servo-ing the length of the cavity to achieve the desired equality of the two signals, proper laser gyro action may be achieved. In the present circuit, the DC voltage which controls cavity length through the use of the piezoelectric transducer 20, is supplied by voltage supply 92. Oscillator 94 provides a superposed alternating current for varying the cavity length in a manner somewhat similar to the dithering of the plasma by the power supply 80. Other circuits included in the cavity control servo loop are the voltage level detector 96 and the synchronous demodulator and analyzer circuit 98. If zero voltage points are not obtained (See FIG. 4) a feedback signal is applied from circuit 98 to the voltage supply 92 on lead 100. With these control arrangements, the proper voltage is applied to the piezoelectric transducer to maintain it at the proper position.

In closing, it is to be understood that the present invention may be implemented by other known equivalent laser or electronic components performing the functions as set forth in the following claims.

I claim:

1. A ring laser gyro comprising:
    a multi-oscillator ring laser including means for generating four modes of laser oscillation at four respectively different frequencies, and with two of the modes propagating in each direction;
    an optical detector for receiving all of said four modes;

means coupled to said detector for determining the rate of rotation of said ring laser;

means coupled to said detector for determining the direction of rotation of said ring laser; and servo means coupled to said detector for adjusting the length of the cavity of said ring laser to substantially equalize the intensity of said four modes.

2. A ring laser gyro as defined in claim 1 wherein said detector is a single photo diode.

3. A ring laser gyro as defined in claim 1 wherein said direction determining means includes means for varying the plasma current of said ring laser.

4. A ring laser gyro as defined in claim 3, further comprising means for comparing the phase of a beat signal derived from said four modes with the phase of said plasma varying means to determine the direction of rotation of said laser gyro.

5. A ring laser gyro as defined in claim 1 further comprising means for fixing said cavity length to a length corresponding to 100% modulation of one beat signal of said four oscillation modes, by another beat signal of said four oscillation modes.

6. A ring laser gyro comprising:

a multi-oscillator ring laser including means for generating four modes of laser oscillation at four respectively different frequencies, and with two of the modes propagating in each direction;

means including an optical detector for receiving all of said four modes and mixing them to produce sum and difference frequencies;

means including a low pass filter for providing first and second gyro signals which have substantially linear frequency versus rate of rotation characteristics, but which are of opposite slope;

means coupled to receive said two gyro signals for determining the rate of rotation of said ring laser;

means coupled to said detector for determining the direction of rotation of said ring laser; and servo means coupled to said detector for adjusting the length of the cavity of said ring laser to substantially equalize the intensity of said four modes.

7. A ring laser gyro as defined in claim 6 wherein said detector is a single photo diode.

8. A ring laser gyro as defined in claim 6 wherein said direction determining means includes means for varying the plasma current of said ring laser.

9. A ring laser gyro as defined in claim 8, further comprising means for comparing the phase of a beat signal derived from said two gyro signals with the phase of said plasma varying means to determine the direction of rotation of said laser gyro.

10. A ring laser gyro as defined in claim 6 further comprising means for fixing said cavity length to a length corresponding to 100% modulation of one of said gyro signals by the other of said gyro signals.

* * * * *